United States Patent [19]
Faulkner et al.

[11] Patent Number: 5,329,757
[45] Date of Patent: Jul. 19, 1994

[54] TURBOCHARGER-BASED BLEED-AIR DRIVEN FUEL GAS BOOSTER SYSTEM AND METHOD

[75] Inventors: Henry B. Faulkner, Dover, Mass.; James B. Kesseli, Mont Vernon, N.H.; Michael C. Swarden, Cambridge; Willem Jansen, Weston, both of Mass.

[73] Assignee: Gas Research Institute, Chicago, Ill.

[21] Appl. No.: 60,410

[22] Filed: May 12, 1993

[51] Int. Cl.⁵ .................................... F02C 3/22
[52] U.S. Cl. ........................ 60/39.02; 60/39.142; 60/39.183; 60/39.281; 60/39.465
[58] Field of Search ............ 60/39.02, 39.142, 39.183, 60/39.281, 39.465

[56] References Cited

U.S. PATENT DOCUMENTS

| | | | |
|---|---|---|---|
| 2,826,038 | 3/1958 | Shannon et al. | 60/39.465 |
| 2,872,781 | 2/1959 | Davies | 60/35.6 |
| 3,052,095 | 9/1962 | Prachar | 60/39.183 |
| 3,104,524 | 9/1963 | Flanders | 60/39.281 |
| 3,161,020 | 12/1964 | LaHaye | 60/39.02 |
| 3,365,121 | 1/1968 | Phillips | 60/39.183 |
| 3,525,218 | 8/1970 | Buss | 60/39.02 |
| 3,574,997 | 4/1971 | Syrovy | 60/13 |
| 3,704,586 | 12/1972 | Bruns | 60/39.142 |
| 4,038,558 | 7/1977 | Gallois | 290/52 |
| 4,043,120 | 8/1977 | Hoffeins | 60/39.142 |
| 4,201,058 | 5/1980 | Vaughan | 60/618 |
| 4,273,508 | 6/1981 | Fomichev et al. | 650/39.281 |
| 4,312,179 | 1/1982 | Zaugg | 60/39.02 |
| 4,380,897 | 4/1983 | Zaba | 60/39.465 |
| 4,483,138 | 11/1984 | Willis | 60/39.465 |
| 4,535,592 | 8/1985 | Zinsmeyer | 60/597 |
| 4,616,482 | 10/1986 | Kronogard et al. | 60/624 |
| 4,674,284 | 6/1987 | Kronogard et al. | 60/624 |
| 4,760,702 | 8/1988 | Ammann et al. | 60/605.2 |
| 4,785,631 | 11/1988 | Striebich | 60/618 |
| 4,829,763 | 5/1989 | Rao | 60/39.05 |
| 4,872,311 | 10/1989 | Sturm | 60/615 |
| 4,922,710 | 5/1990 | Rowen et al. | 60/39.281 |
| 5,056,315 | 10/1991 | Jenkins | 60/614 |
| 5,079,913 | 1/1992 | Kishishita | 60/597 |

FOREIGN PATENT DOCUMENTS

| | | | |
|---|---|---|---|
| 0057012 | 4/1983 | Japan | 60/39.465 |
| 0258930 | 11/1986 | Japan | 60/39.465 |
| 0032128 | 2/1988 | Japan | 60/39.465 |
| 0765270 | 1/1957 | United Kingdom | 60/39.465 |

Primary Examiner—Louis J. Casaregola
Assistant Examiner—Howard R. Richman
Attorney, Agent, or Firm—Speckamn, Pauley & Fejer

[57] ABSTRACT

A method and system for increasing the pressure of gaseous fuel delivered to a fuel system of a gas turbine engine. A portion of pressurized gas or compressed air is discharged from a high-pressure section of the gas turbine engine and is communicated to a plurality of radial inflow turbines or axial flow turbines. Energy is transferred from each turbine to a plurality of compressors driven by the turbines. Gaseous fuel is supplied to an inlet of one of the compressors. The compressed gaseous fuel is then cooled downstream of the compressors. The aftercooled and compressed gaseous fuel is delivered to the fuel system of the gas turbine engine.

17 Claims, 3 Drawing Sheets

TURBOCHARGER-BASED BLEED-AIR DRIVEN FUEL GAS BOOSTER SYSTEM AND METHOD

BACKGROUND OF THE INVENTION

1. Field of the Invention

This invention relates to a method and a system for increasing fuel gas pressure delivered to the fuel system of a gas turbine engine.

2. Description of Prior Art

In many installations of stationary gas turbine engines which operate on natural gas fuel, an increase in pressure of the gaseous fuel is necessary since local natural gas supplies deliver the natural gas at insufficient pressures. Thus, a compressor is normally used to raise the pressure from the natural gas supply to an increased pressure required by the gas turbine engine. Conventional positive displacement gas compressors of the reciprocating or rotary screw types are used to accomplish such pressure increase. Such conventional compressors are typically standard units that are manufactured for other applications, and are driven by conventional electric motors. The reciprocating type of positive displacement gas compressor is more efficient than the rotary type but typically requires a space which is as large as the gas turbine engine and a heavy or substantial base, which results in higher installation and maintenance costs.

A centrifugal or axial compressor is normally more compact than a positive displacement compressor. However, with the combination of relatively low flow rates and relatively high pressure ratios required by gas turbine engines, particularly those with less than 10 MW power ratings, such flow parameters are outside of typical output ranges for conventional centrifugal or axial compressors. Thus, a centrifugal or axial compressor would normally require more than four stages, or operate at relatively high rotational speeds of about 50,000 rpm or more. Using four stages would likely preclude the possibility of reducing the cost of the compressor to below the cost of a comparable positive displacement compressor.

The power input of conventional fuel gas booster systems is in the range of 2-5% of the total output power of the gas turbine engine. Thus, even for a gas turbine engine having as little as a 1 MW output power rating, at least 20 kW would be required to power the conventional fuel gas booster. Electric motors of this size and larger are limited as drive units for the compressors, due to the relatively high shaft speed of the centrifugal or axial compressor. Expensive and cumbersome gear boxes would be necessary to match an electric motor drive unit with a centrifugal or axial flow compressor. Thus, it is apparent that there is a need for a relatively small turbocompressor or turbocharger system for boosting the pressure of gaseous fuel supplied to the fuel system of a gas turbine engine.

SUMMARY OF THE INVENTION

It is one objective of this invention to provide a method and system for eliminating conventional electrically-driven compressor equipment used to increase or boost pressure of a gaseous fuel to a level sufficient for delivering the gaseous fuel to the fuel system of a gas turbine engine.

It is another object of this invention to provide a method and system for boosting the gaseous fuel pressure which is driven by one or more radial inflow or axial turbines using pressurized gas, such as compressed air, bled from either a compressor section or a turbine section of the gas turbine engine.

It is another object of this invention to provide a method and system for increasing gaseous fuel pressure delivered to the fuel system of the gas turbine engine, wherein the gaseous fuel is pressurized through one or more centrifugal or axial flow compressors which are each driven by a corresponding radial inflow turbine.

It is still another object of this invention to provide a method and system for increasing gaseous fuel pressure wherein downstream from the centrifugal compressors, the gaseous fuel is cooled to a temperature which is suitable for delivery to the fuel system of the gas turbine engine.

It is yet another object of this invention to provide a method and system for increasing gaseous fuel pressure wherein the gaseous fuel pressure is controlled as a function of a power demand of the gas turbine engine.

The above and other objects of this invention are accomplished with a method for increasing fuel gas pressure to a fuel system of a gas turbine engine, wherein a portion of pressurized gas, such as compressed air, is discharged from a high-pressure section of the gas turbine engine. The high-pressure section may include a compressor section, a turbine section, or another suitable point or section in the gas turbine engine where the gas or air is increased to a pressure above the inlet pressure of the gas turbine engine. The portion of pressurized gas or compressed air is discharged through a suitable conduit, housing passageway or the like, preferably to one or more turbines.

In one preferred embodiment according to this invention, each turbine is mechanically coupled to a corresponding compressor. Energy is transformed from the turbines to the corresponding compressors. The gaseous fuel is supplied to an inlet of one or more of the compressors. The gaseous fuel is preferably compressed through a series arrangement of the compressors. However, it is apparent that under certain flow conditions the gaseous fuel can be compressed through a parallel arrangement of the compressors. In one preferred embodiment according to this invention, the compressed gaseous fuel is cooled downstream of the last stage of the series arrangement of compressors, in order to lower the temperature of the gaseous fuel which is delivered to the engine fuel system. Such cooling is preferably accomplished with a water-cooled heat exchanger. The aftercooled and compressed gaseous fuel is then delivered to the fuel system of the gas turbine engine.

In one preferred embodiment according to this invention, the delivery pressure of the gaseous fuel to the fuel system of the gas turbine engine is controlled as a function of a power demand of the gas turbine engine. Various computer software and hardware, mechanical valves and/or other controls can be used to control the delivery pressure, such as by varying a pressure drop across each turbine, or by any other suitable method or system of control.

In another preferred embodiment according to this invention, the pressurized gas or compressed air which is discharged from the gas turbine engine is heated after exiting the gas turbine engine, in order to increase the energy of the pressurized gas or compressed air which is used to drive the turbines.

In another preferred embodiment according to this invention, an auxiliary pressurized gas source is used to temporarily augment energy delivered to the turbines, such as during start-up of the gas turbine engine when pressure of the portion of pressurized gas or compressed air bled from the gas turbine engine is insufficient to provide the necessary power for driving the turbines. Such auxiliary pressure can be supplied from a plant air system, pressurized storage tanks, or another suitable pressurized gas supply.

The method and system according to this invention successfully eliminates electrical and mechanical equipment associated with electrically-driven conventional compressors used to boost gaseous fuel pressure, for delivery to an engine fuel system. Retrofitted or modified turbochargers, such as those used in automobiles, can be used for components of the system according to this invention, thereby greatly reducing costs. The bleed-gas or bleed-air driven compressors according to this invention can be easily controlled to deliver the gaseous fuel under various flow conditions, depending upon the power demand of the gas turbine engine. Furthermore, the system according to this invention requires relatively few mechanically moving parts and is more compact when compared to equivalent electrically-driven compressors.

BRIEF DESCRIPTION OF THE DRAWINGS

The above and other objects of this invention will become more apparent when the specification and claims are taken in view of the drawings, wherein:

DETAILED DESCRIPTION OF PREFERRED EMBODIMENTS

The method and system according to this invention are used to increase or boost the pressure of gaseous fuel which is fed or delivered to a fuel system of a gas turbine engine. High-pressure bleed gas, which is preferably compressed air or another suitable pressurized gas, is tapped from a compressor section and/or a turbine section of the gas turbine engine. Thus, there is no requirement for an electric motor to drive the booster compressor. Energy from the high-pressure gas is converted to shaft power in one or a plurality of radial inflow turbines or axial turbines. The system according to this invention is particularly advantageous since the compressor section and the turbine section can be retrofitted from an existing turbocharger or can be a modified conventional turbocharger, such as one used to supercharge a reciprocating internal combustion engine.

Figure 1:
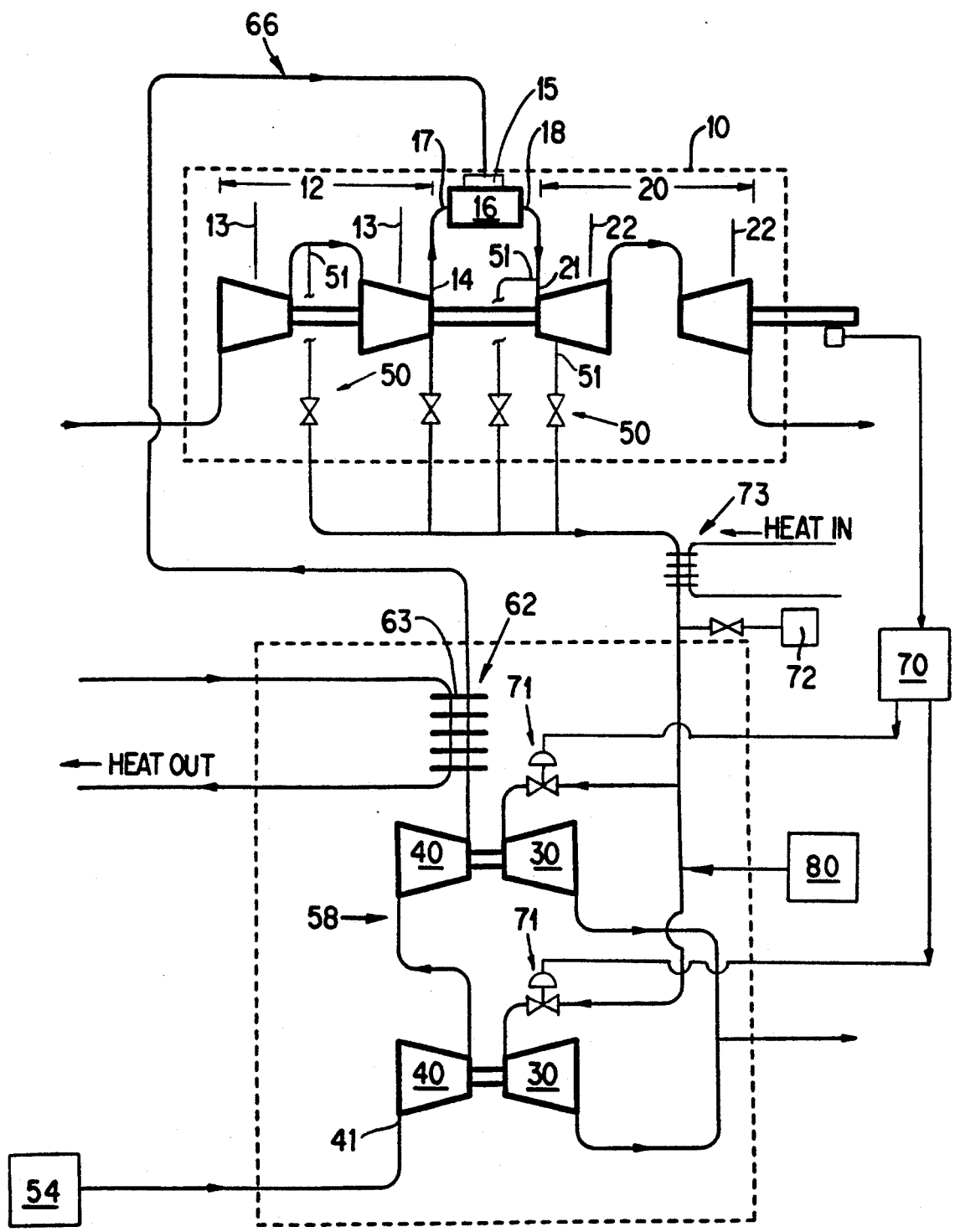
FIG. 1 is a schematic diagram showing one preferred embodiment of a system setup used to accomplish one preferred method according to this invention.

FIG. 1 shows a schematic diagram of a turbocharger-based bleed-air driven fuel gas pressure booster system according to one preferred embodiment of this invention. FIG. 1 shows three main components of gas turbine engine 10: compressor section 12, combustor 16 and turbine section 20. It is apparent that depending upon the particular design of gas turbine engine 10, compressor section 12 and turbine section 20 can each comprise one or a plurality of stages through which the compression or expansion process may occur. As shown in FIG. 1, compressor section 12 has two stages and turbine section 20 has two stages.

Discharge means 50 are used to discharge a portion of pressurized gas from a high-pressure section of gas turbine engine 10. As used throughout this specification and in the claims, the term "high-pressure section" is intended to relate to a portion of gas turbine engine 10, such as compressor section 12, combustor 16 and/or turbine section 20, from which gas or air is bled at a pressure higher than the inlet pressure of the gas or air entering the first stage of compressor section 12. It is apparent that one or more of such bleed lines can be used to bleed the high-pressure gas from gas turbine engine 10. It is also apparent that if a plurality of bleed lines are used, such bleed lines can either be used in any combination or as individual lines can be used to drive individual turbines 30, as discussed below.

Discharge means 50 may comprise discharge nozzle 51 positioned at any suitable location of compressor section 12 and/or turbine section 20. As shown in FIG. 1, various discharge nozzles 51 are schematically shown to be in communication with various stages of compressor section 12 and turbine section 20. It is apparent that a valve associated with any one or more of such discharge nozzles 51 can be open to supply pressurized gas, preferably compressed air or any other suitable gas that operates with gas turbine engine 10.

According to another preferred embodiment of this invention, auxiliary pressurized gas source 80 is temporarily used to augment energy delivered to turbines 30, such as during start-up of gas turbine engine 10 when pressure of the high-pressure gas bled from gas turbine engine 10 is insufficient to provide the necessary power for driving turbines 30. Auxiliary pressure gas source 80 can be a plant air system, pressurized storage tanks, or another suitable pressurized gas supply.

According to one preferred embodiment of this invention, a plurality of turbines 30 are used to drive a plurality of compressors 40. It is apparent that one turbine 30 and one compressor 40 can be used to accomplish a pressure increase of the gaseous fuel delivered to fuel system 15. However, most fuel systems associated with combustor 16 will require two or more compressors 40 and two or more turbines 30. Also, it is apparent that a multi-stage compressor and/or turbine can be substituted for independent compressors and/or turbines, respectively.

Figure 1A:
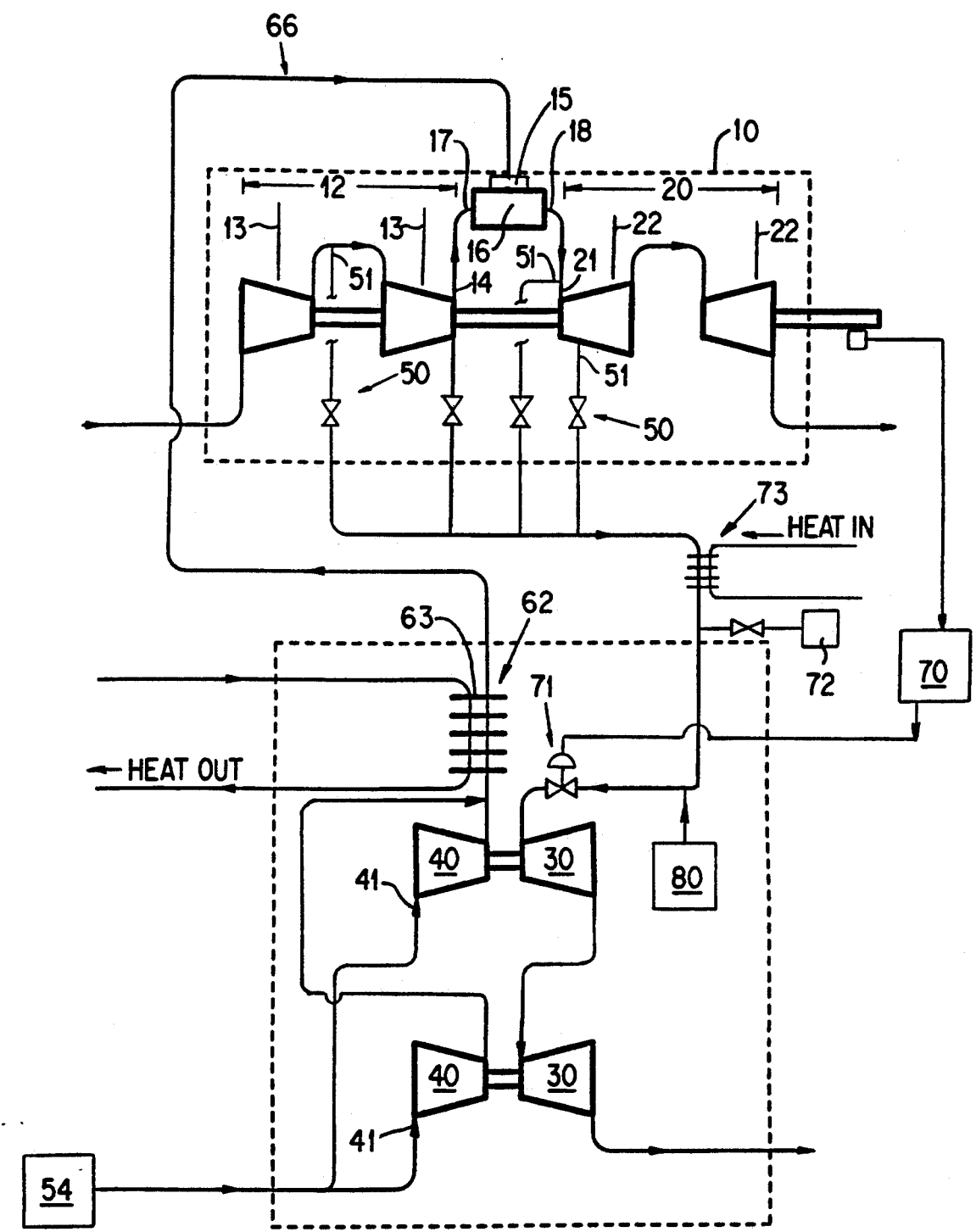
FIG. 1A is a schematic diagram showing another preferred embodiment of a system setup used to accomplish another preferred method according to this invention.
Figure 2:
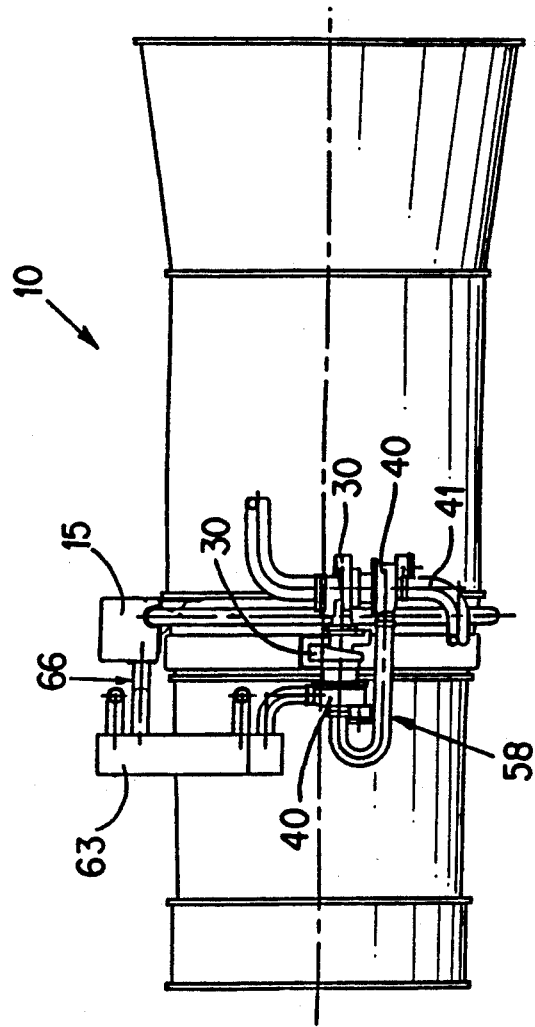
FIG. 2 is a diagrammatic front view of a turbocharger-based bleed-air driven fuel gas booster system mounted on a gas turbine engine housing, according to one preferred embodiment of this invention.
Figure 3:
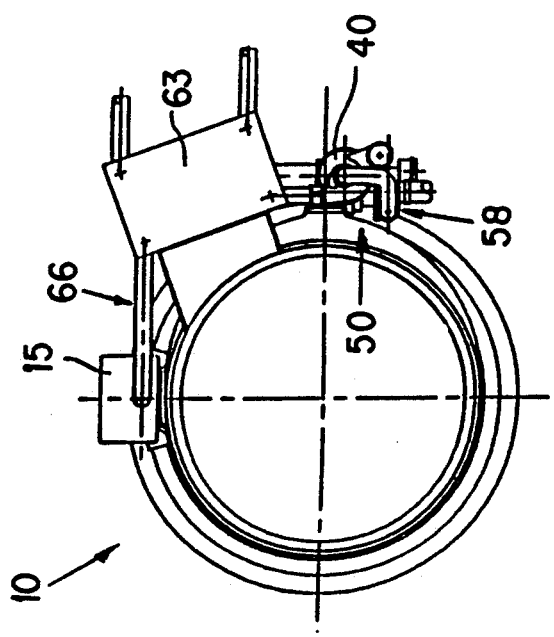
FIG. 3 is a side view of the turbocharger-based bleed-air driven gaseous fuel booster system, as shown in FIG. 2.

As shown in FIG. 1, turbines 30 operate in a parallel arrangement. It is apparent that turbines 30 can also operate in a series arrangement, as shown in FIG. 1A, depending upon the particular flow conditions and power ratings associated with gas turbine engine 10. Also as shown in FIG. 1, compressors 40 operate in a series arrangement. Also depending upon the flow conditions and power ratings of gas turbine engine 10, compressors 40 can operate in a parallel arrangement, as shown in FIG. 1A. However, for most practical applications, a series arrangement of compressors 40 is necessary to achieve the required pressure increase for delivering the compressed gaseous fuel to fuel system 15.

As shown in FIG. 1, each compressor 40 is independently driven by a corresponding turbine 30. Among other factors, such arrangement accommodates the use of retrofitted or modified equipment, such as conventional turbochargers or turbocompressors, from existing sources such as automobiles, diesel engines and the like. It is apparent that with the appropriate gear assemblies and mechanical couplings, a single turbine 30 can be used to drive a plurality of compressors 40, and a plurality of turbines 30 can be used to drive a single compressor 40.

A significant benefit of this invention is achieved when using a turbocharger as the operating unit for boosting the pressure of the gaseous fuel. Use of a turbocharger has advantages over the use of a turbocompressor. For gas turbine engines 10 having a relatively small power rating, the physical size of the rotating equipment is smaller than that which is commercially available. Relatively large gas turbine engines usually do not require gaseous fuel boosters, since higher gas or air pressure is readily available. Turbocompressors are specifically designed for a particular purpose and thus the associated turbomachinery is expensive relative to the cost of compatible positive displacement machinery. Furthermore, because turbocompressors are normally designed for a particular use, the pressure ratio and flow conditions are unique to the particular use for the turbocompressor and thus relatively few identical turbocompressors are mass produced. By using a turbocharger unit with the method and system according to this invention, existing turbocharger units that are used in automobile applications are manufactured in mass quantities can be used to reduce the cost relative to compatible turbomachinery. Also, there is a much greater variety of turbochargers commercially available, in terms of pressure ratio and flow conditions, so that the existing turbochargers can meet the requirements of many different applications for driving a gaseous fuel booster of this invention.

Gas inlet means 54 are used to supply a suitable gaseous fuel to compressor inlet 41 of the first stage compressor 40, according to one preferred embodiment as shown in FIG. 1. Such gas inlet means 54 may comprise any suitable gaseous fuel supply and an appropriate conduit forming communication between the gaseous fuel supply and compressor inlet 41. Interstage means 58 are used to form serial communication of the gaseous fuel between compressors 40, such as the first stage compressor 40 and the second stage compressor 40, as shown in FIG. 1. Such interstage means may comprise a suitable conduit, housing passageway or other appropriate communication means for transferring the gaseous fuel between compressor stages.

According to one preferred embodiment of this invention, heat transfer means 62 are used to cool the compressed gaseous fuel at an area in the system which is downstream from the final compression stage, or downstream from the last compressor 40. As used throughout this specification and in the claims, the word "downstream" is intended to be relative to a direction of flow of the applicable fluid. Such aftercooling occurs downstream, with respect to a direction of flow of the gaseous fuel, from the final compressor 40. Such aftercooling also occurs upstream of fuel system 15. Fuel systems on many conventional gas-fueled gas turbine engines 10 cannot tolerate an input gaseous fuel temperature of more than approximately 130° F. to approximately 200° F. Thus, in most gas turbine engine systems, heat exchanger 63 is necessary for aftercooling the compressed gaseous fuel prior to entry into fuel system 15. Heat exchanger 63 is preferably a water-cooled heat exchanger since such type is most practical and economically viable for use with gas turbine engine 10. However, it is apparent that heat exchanger 63 can be any other suitable type of heat exchanger, such as an air-cooled heat exchanger.

Delivery means 66 are used to deliver the aftercooled and compressed gaseous fuel to fuel system 15. In one preferred embodiment according to this invention, delivery means 66 comprise a conduit, such as tubing, piping or a housing passageway.

The pressurized gas can be tapped from any intermediate or final stage of compressor section 12, or from any entry or intermediate stage of turbine section 20, provided there is sufficient pressure to drive turbines 30. If the gas or air is bled from an earlier stage of compressor section 12, the pressure of the gas or air will be lower than a later stage and thus more mass flow of the gas or air will be required. If the pressurized gas is tapped from turbine section 20, the energy per unit mass of the pressurized gas would be increased by the heat addition due to combustion within combustor 16. With such increased energy per unit mass, relatively less mass flow would be required to be tapped from gas turbine engine 10 to drive turbines 30. According to another preferred embodiment of this invention, external means are used to heat the portion of pressurized gas downstream, with respect to a directional flow of pressurized gas, from gas turbine engine 10. According to one preferred embodiment of this invention, external means 73 comprise a heat exchanger suitable for transferring heat from the exhaust of gas turbine engine 10 to the pressurized gas discharged from gas turbine engine 10.

According to another preferred embodiment of this invention, this system may further comprise control means for controlling a delivery pressure of the gaseous fuel to fuel system 15, preferably as a function of a power demand of gas turbine engine 10. In one preferred embodiment according to this invention, the control means comprise computer means 70, as shown in FIG. 1, which receives a signal from gas turbine engine 10 or another source, indicating flow conditions and/or power ratings or requirements. With such input, computer means 70 can calculate necessary flow conditions for power input to turbines 30. In one preferred embodiment according to this invention, computer means 70 emits a signal to throttle means 71, such as a throttle control valve or other similar mechanical device, for varying the flow conditions to the inlet of each turbine 30.

According to another preferred embodiment of this invention, delivered fuel pressure is sensed and used to control a throttle valve in discharge means 50. If the delivered fuel pressure at fuel system 15 rises above the set point, the throttle valve closes, the speed of turbine 30 drops, and the delivered pressure drops. The reverse happens when the delivered pressure drops below the set point. If the throttle valve is downstream of turbine 30, the average pressure in turbine 30 is higher, and there is more likely to be a problem with thrust in the turbocompressor combination. Therefore the throttle valve is preferably positioned upstream of turbine 30 or turbines 30.

As the flow through a centrifugal or axial compressor is reduced at constant pressure, at some point a region of undesirable unstable operation is reached, known as surge. The control means according to this invention must keep the compressor out of this operating region. Operation of gas turbine engine 10 at low pressure levels, including idle, will require large reductions in fuel flow. A less efficient control scheme can be used to accommodate such infrequent lower flows without allowing compressor section 12 to surge. The control means can open a valve to allow some gaseous fuel to recirculate from the aftercooler discharge back to the compressor inlet, so the flow through compressor 40 is greater than the flow delivered to gas turbine engine 10.

According to one preferred embodiment of a method of this invention, wherein gaseous fuel pressure is increased for supplying fuel system 15, a portion of pressurized gas from a high-pressure section, such as compressor section 12 and/or turbine section 20, is discharged to a plurality of turbines 30. Energy is transferred from turbines 30 to a plurality of compressors 40, each independently driven by a corresponding turbine 30. Gaseous fuel is supplied to an inlet of one or more compressors 40, preferably to the first or entry stage of compressors 40. The gaseous fuel is compressed through compressors 40, which preferably operate in a series arrangement. The compressed gaseous fuel is cooled downstream from compressors 40. The aftercooled and compressed gaseous fuel is then delivered to fuel system 15.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A method for increasing fuel gas pressure to a fuel system of a gas turbine engine, the steps comprising:
    (a) discharging a portion of pressurized gas from a high-pressure section of a gas turbine engine to at least one of a plurality of turbines;
    (b) transferring energy from said turbines to a plurality of compressors where each of said turbines drives a corresponding compressor of said compressors;
    (c) supplying a gaseous fuel to an inlet of each of said compressors;
    (d) compressing said gaseous fuel through said compressors;
    (e) aftercooling the compressed gaseous fuel downstream, with respect to a direction of flow of said gaseous fuel, of said compressors;
    (f) delivering the aftercooled and compressed gaseous fuel to a fuel system of the gas turbine engine; and
    (g) controlling a delivery pressure of said gaseous fuel at a fuel inlet of the fuel system as a function of a power demand of the gas turbine engine, controlling said delivery pressure by varying a pressure drop across said turbines.

2. A method according to claim 1 wherein said portion of pressurized gas is bled from an area between a compressor discharge of a compressor section of the gas turbine engine and a combustor inlet of a combustor of the gas turbine engine.

3. A method according to claim 1 wherein said portion of pressurized gas is bled from an intermediate compressor stage of a compressor section of the gas turbine engine.

4. A method according to claim 1 wherein said portion of pressurized gas is bled from a point between a combustor discharge of a combustor of the gas turbine engine and a turbine inlet of a turbine section of the gas turbine engine.

5. A method according to claim 1 wherein said portion of pressurized gas is bled from an intermediate turbine stage of a turbine section of the gas turbine engine.

6. A method according to claim 1 wherein said portion of pressurized gas is heated downstream with respect to a direction of flow of said portion of pressurized gas after being bled from the gas turbine engine and upstream of said turbines.

7. A method according to claim 1 further comprising supplying an auxiliary pressurized gas to said turbines during start-up of the gas turbine engine.

8. A system for increasing fuel gas pressure to a fuel system of a gas turbine engine, the system comprising:
    a plurality of turbines, a plurality of compressors, each of said turbines driving one corresponding compressor of said compressors;
    discharge means for discharging a portion of pressurized gas from a high-pressure section of the gas turbine engine to at least one of said turbines;
    gas inlet means for supplying a gaseous fuel to a compressor inlet of at least one of said compressors;
    heat transfer means for aftercooling the compressed gaseous fuel downstream of said compressors;
    delivery means for delivering the aftercooled and compressed gaseous fuel to a fuel system of the gas turbine engine;
    control means for controlling a delivery pressure of said gaseous fuel to the fuel system as a function of a power demand of the gas turbine engine; and
    said control means comprising computer means for emitting a signal to throttle means for varying a pressure drop across said turbines.

9. A system according to claim 8 wherein said discharge means further comprise a discharge nozzle in communication between and with a compressor discharge of a compressor section of said high-pressure section and a combustor inlet of a combustor of the gas turbine engine.

10. A system according to claim 8 wherein said discharge means further comprise a discharge nozzle in communication with an intermediate compressor stage of said high-pressure section.

11. A system according to claim 8 wherein said discharge means further comprise a discharge nozzle in communication between and with a combustor discharge of a combustor of said gas turbine engine and a turbine inlet of a turbine section of said gas turbine engine.

12. A system according to claim 8 wherein said discharge means further comprise a discharge nozzle in communication with an intermediate turbine stage of a turbine section of said gas turbine engine.

13. A system according to claim 8 wherein said heat transfer means further comprise a water-cooled heat exchange.

14. A system according to claim 8 further comprising auxiliary means for supplying auxiliary pressurized gas to said turbines during start-up of said gas turbine engine.

15. A system according to claim 14 wherein said auxiliary means further comprise a source of pressurized gas.

16. A system according to claim 8 further comprising external means for heating said portion of pressurized gas downstream of said gas turbine engine and upstream of said turbines.

17. A system for increasing fuel gas pressure to a fuel system of a gas turbine engine, the system comprising:
   a plurality of turbocharger units;
   discharge means for discharging a portion of pressurized gas from a high-pressure section of the gas turbine engine to said turbocharger units;
   gas inlet means for supplying a gaseous fuel to a compressor inlet of at least one of said turbocharger units;
   heat transfer means for aftercooling the compressed gaseous fuel downstream of said turbocharger units;
   delivery means for delivering the aftercooled and compressed gaseous fuel to a fuel system of the gas turbine engine;
   control means for controlling a delivery pressure of said gaseous fuel to the fuel system as a function of a power demand of the gas turbine engine; and
   said control means comprising computer means for emitting a signal to throttle means for varying a pressure drop across said turbocharger units.

* * * * *